(12) United States Patent
Brinkmeier et al.

(10) Patent No.: US 7,937,995 B2
(45) Date of Patent: May 10, 2011

(54) METHOD FOR MONITORING AN EXHAUST GAS PURIFYING COMPONENT

(75) Inventors: Clemens Brinkmeier, Stuttgart (DE);
Christof Schoen, Remshalden (DE);
Guido Vent, Backnang (DE)

(73) Assignee: Daimler AG, Stuttgart (DE)

( * ) Notice: Subject to any disclaimer, the term of this patent is extended or adjusted under 35 U.S.C. 154(b) by 456 days.

(21) Appl. No.: 12/065,008

(22) PCT Filed: Aug. 3, 2006

(86) PCT No.: PCT/EP2006/007684
§ 371 (c)(1),
(2), (4) Date: Jul. 10, 2008

(87) PCT Pub. No.: WO2007/025626
PCT Pub. Date: Mar. 8, 2007

(65) Prior Publication Data
US 2008/0314133 A1  Dec. 25, 2008

(30) Foreign Application Priority Data
Aug. 30, 2005 (DE) .................. 10 2005 040 906

(51) Int. Cl.
*G01M 15/10* (2006.01)
(52) U.S. Cl. .................................. 73/114.75
(58) Field of Classification Search .......... 73/114.69, 73/114.71, 114.75
See application file for complete search history.

(56) References Cited

U.S. PATENT DOCUMENTS

| 5,431,012 | A | 7/1995 | Narula et al. |
| 5,435,172 | A | 7/1995 | Pelters et al. |
| 6,761,023 | B1 | 7/2004 | Schnaibel et al. |
| 7,021,129 | B2* | 4/2006 | Busch et al. ............ 73/114.75 |
| 7,299,689 | B2* | 11/2007 | Audoin .................. 73/114.75 |
| 2002/0005064 | A1* | 1/2002 | Ohkuma ................. 73/116 |
| 2005/0076710 | A1* | 4/2005 | Audoin .................. 73/118.1 |
| 2009/0199550 | A1* | 8/2009 | Gloeckle et al. ......... 60/301 |
| 2009/0211230 | A1* | 8/2009 | Breuer et al. ........... 60/274 |

FOREIGN PATENT DOCUMENTS

| DE | 199 63 902 A1 | 7/2001 |
| JP | 7-104184 A | 4/1995 |
| JP | 2001-98982 A | 4/2001 |
| JP | 2005-201143 A | 7/2005 |
| WO | WO 96/01364 A1 | 1/1996 |

OTHER PUBLICATIONS

International Search Report dated Oct. 6, 2006 and PCT/ISA/237 with English translation of relevant portion (Twelve (12) pages).

* cited by examiner

*Primary Examiner* — Eric S McCall
(74) *Attorney, Agent, or Firm* — Crowell & Moring LLP

(57) ABSTRACT

In a method for monitoring an exhaust gas purifying component with gas storage capability for purifying exhaust gases from an internal combustion engine, the exhaust gas purifying component comprises a gas storage material which changes from a first state into a second state upon storage of the gas. A temperature change of the exhaust gas purifying component and/or of the gas storage material, substantially based on a heat tonality of the modification transition, is measured and evaluated.

12 Claims, 7 Drawing Sheets

METHOD FOR MONITORING AN EXHAUST GAS PURIFYING COMPONENT

This application is a national stage of PCT International Application No. PCT/EP2006/007684, filed Aug. 3, 2006, which claims priority under 35 U.S.C. §119 to German Patent Application No. 10 2005 040 906.7, filed Aug. 30, 2005, the entire disclosure of which is herein expressly incorporated by reference.

BACKGROUND AND SUMMARY OF THE INVENTION

The invention relates to a method for monitoring an exhaust gas purifying component with gas storage capability for purifying exhaust gases from an internal combustion engine.

International Patent Document WO 96/01364 discloses a catalyst monitoring system for monitoring an exhaust gas purifying component with gas storage capability for purifying exhaust gases from an internal combustion engine. The system comprises a thin-film resistance thermometer as a temperature sensor, which may be incorporated into an exhaust gas purifying component. The temperature sensor detects temperature changes occurring at a catalyst material during oxidation of reducing exhaust gas constituents as a result of the heat of reaction then released. These changes serve as a measure for assessing the activity of the catalyst with regard to the relevant oxidation reactions. (Impaired catalytic activity results in reduced conversion of the oxidizable exhaust gas constituents and thus smaller temperature changes.)

Comparison with reference values allows catalyst impairment to be determined. However, the magnitude of the temperature change occurring upon conversion of the oxidizable constituents is heavily dependent on parameters such as exhaust gas composition, flow rate, temperature, and the like. An evaluation of the temperature changes with regard to catalyst activity is therefore difficult, and may result in misinterpretations.

It is therefore an object of the invention to provide a method which enables improved monitoring of an exhaust gas purifying component with gas storage capability.

This and other objects and advantages are achieved by the method according to the invention for monitoring an exhaust gas purifying component with gas storage capability, in which a temperature change of the exhaust gas purifying component and/or of the gas storage material is evaluated based substantially on the heat tonality of the modification transition of the gas storage material. Storage of a gas in the gas storage material is associated with a modification transition of the gas storage material, which is accompanied by a heat tonality. The modification transition preferably involves a change in the chemical structure of the gas storage material as a result of gas storage by a chemical reaction of the gas storage material with the gas. Examples here are storage of nitrogen oxides in the form of nitrates in a nitrogen oxide storage material, which is present in the initial state for example as carbonate. A chemical structural change also takes place upon storage of oxygen in an oxygen storage material such as cerium oxide or a cerium oxide-containing mixed oxide, in which case the material develops into an oxygen-rich modification of high chemical valency upon oxygen absorption.

However, it may also involve a change in the modification in the form of formation of a chemisorptive bond of the gas storage material with the gas, in which the chemical structure of the gas storage material remains substantially unchanged but the stored gas is bonded to the gas storage material by weak chemical bonds. An example of this is the adsorption of hydrocarbons in storage materials suitable therefor, such as for example zeolites.

The reaction and/or sorption enthalpies associated with these chemical reactions or bonding processes lead to a so-called heat tonality, which in turn has as a consequence a measurable temperature change of the gas storage material or the exhaust gas purifying component. Transition of the gas storage material from a first to a second modification may also involve a combination of the stated modification transitions. Accordingly, the exhaust gas purifying component preferably comprises a catalytic converter and/or an adsorber with a gas storage material, which may bond an exhaust gas component such as oxygen, nitrogen oxide, sulfur oxide, ammonia, hydrocarbon, carbon monoxide, carbon dioxide or water. The method is particularly suitable for monitoring catalytic exhaust gas purifying components of the supported catalyst type. In these components, the gas storage material is applied to a ceramic or metal foil support, preferably in the form of a honeycomb structure.

The extent of the temperature change depends on the one hand on the type of modification transition. By detecting and evaluating the temperature change associated with a modification transition, it is possible to draw conclusions about the type and intensity thereof and to monitor the exhaust gas purifying component accordingly.

On the other hand, the amount of gas storage material affected by the modification transition influences the extent of the temperature change. By evaluating the temperature change associated with the modification transition, it is therefore possible to draw conclusions about the amount of active gas storage material, and to monitor the exhaust gas purifying component for a decrease in material or activity.

As a development of the method, the temperature change is evaluated with regard to aging of the exhaust gas purifying component. For example, as a result of thermal loading, exhaust gas purifying components generally lose their gas storage capability over the course of their service life. Often this takes the form of a loss in activity of the gas storage material as a result of sintering and/or phase transition or phase segregation processes. By evaluating the temperature changes caused by the change in modification of the gas storage material, the extent of aging of the exhaust gas purifying component (and for example an aging index) may therefore be established.

According to a further feature of the invention, the temperature change arising when the operating mode of the internal combustion engine changes is evaluated, preferably, a change in which the composition of the internal combustion engine exhaust gas changes from hypostoichiometric (i.e., reducing), to hyperstoichiometric (i.e., oxidizing). Such a change in operating mode involves a change in the exhaust gas composition (essential exhaust gas constituents). This also affects the storage of exhaust gas constituents in the exhaust gas purifying component through which exhaust gas flows. Consequently, when a change of the stated type takes place in the operating mode, monitoring and assessment of the exhaust gas purifying component may be effectively performed. It is particularly advantageous in this connection, as a further development of the method, to evaluate the increase in temperature that occurs upon a change from traction mode operation of the internal combustion engine with a hypostoichiometric air/fuel ratio ($\lambda<1.0$) to overrun mode with a hyperstoichiometric air/fuel ratio ($\lambda>1.0$).

According to a further feature of the invention, an exhaust gas purifying component with oxygen storage capability is monitored. This is preferably an oxidation catalyst and/or a three-way catalyst or a nitrogen oxide storage catalyst. With these catalyst types, the oxygen storage capability is important for catalyst function. Using the method according to the invention, it is therefore possible to perform a diagnosis with regard to catalyst efficiency, in particular in the case of the stated catalyst types.

According to a further feature of the invention, an exhaust gas purifying component with a cerium oxide-containing gas storage material is monitored. Cerium oxide-containing materials have an oxygen storage capability, wherein, when oxygen is stored, the proportion of trivalent cerium oxide ($Ce_2O_3$) decreases in favor of tetravalent cerium oxide ($CeO_2$). This process is associated with heat release, so that cerium oxide-containing exhaust gas purifying components may be monitored particularly effectively in accordance with the invention.

According to a further feature of the invention, detection of the temperature changes takes place at least two different points in the exhaust gas purifying component. Since exhaust gas purifying components are generally exposed to a decreasing load in the axial direction (i.e., in the direction of exhaust gas through-flow), it is particularly advantageous for temperature changes to be detected at points that are offset axially relative to one another. In this way, monitoring is particularly accurate, and aging can be determined in a spatially resolved manner.

According to a further feature of the invention, detection of the temperature change takes place at a point that is spaced from an exhaust gas inlet side of the exhaust gas purifying component in the direction of exhaust gas flow. Detecting the temperature at a distance from the gas inlet side prevents exothermic oxidation of exhaust gas components occurring principally on the exhaust gas inlet side from disturbing or distorting the heat tonality of a modification transformation of the gas storage material. An especially exothermic modification transition may therefore be particularly reliably detected at a point spaced from the exhaust gas inlet side, further improving monitoring of the exhaust gas purifying component.

In particular it is advantageous if, according to a further aspect of the invention, detection of the temperature increase takes place in an area of the exhaust gas purifying component which is spaced by more than 10 mm, in particular by more than 30 mm from the gas inlet side thereof in the direction of exhaust gas flow. This applies in particular to the exhaust gas purifying component first exposed to the engine's exhaust gas. If one or more in particular catalytic exhaust gas purifying components are arranged upstream of the exhaust gas purifying component, detection of the temperature increase may also take place directly at the inlet-side end of the exhaust gas purifying component.

According to a further feature of the invention, detection of the temperature increase takes place using a temperature sensor which is inserted into the exhaust gas purifying component in such a way that a temperature-sensitive part of the temperature sensor is in heat transfer contact with the gas storage material. In this way, a change in the temperature of the gas storage material resulting from a modification transition may be detected particularly sensitively and accurately. In this respect, it is particularly advantageous if, according to a further aspect of the invention, a temperature sensor with a low thermal mass is used to detect the temperature increase. This is the case, for example, when the thermal capacity of the relevant temperature sensor part is roughly of the order of magnitude of the gas storage material quantity detected thereby.

Advantageous embodiments of the invention are illustrated in the drawings and are described below. The above-mentioned features and those still to be explained below may in this regard be used not only in the respectively stated combinations of features but also in other combinations or alone, without going beyond the scope of the present invention.

BRIEF DESCRIPTION OF THE DRAWINGS

FIG. 1b is a time profile diagram of the exhaust gas/air ratio associated with a change in operating mode according to FIG. 1a;

FIG. 1c is a time profile diagram of temperatures in a catalyst with oxygen storage capability arranged in the exhaust gas line of the internal combustion engine in the event of a change in operating mode according to FIG. 1a;

DETAILED DESCRIPTION OF THE INVENTION

The principle underlying the method according to the invention will be explained in greater detail below with reference to FIGS. 1a to 1c. The description is based on an automobile with a spark ignition internal combustion engine, with an exhaust gas catalyst arranged in the exhaust gas line, close to the engine, as a so-called primary catalyst or bulkhead catalyst. The catalyst under consideration is a conventional ceramic-supported catalyst with a cerium oxide-containing coating acting as an oxygen store means, having a honeycomb structure with a length of approx. 80 mm. Although the method according to the invention is also applicable to other exhaust gas purifying components with gas storage capability, it is particularly suitable for monitoring and diagnosis of primary catalysts, since the latter are exposed to very heavy thermal loading and are therefore at increased risk of aging or damage. Possible oxygen-storing materials other than cerium oxide are other oxides, in particular rare earth oxides such as lanthanum or praseodymium.

At time t0 in the diagrams, the operating state of the internal combustion engine changes from the traction mode (with power output) to an overrun mode (with power consumption). In overrun mode, so-called overrun fuel cut-off takes place, with the fuel supply being cut off and the intake air throttled. Consequently, the intake air mass flow rate mL falls abruptly at the time t0, while the internal combustion engine speed n remains virtually constant, as illustrated by the profile of traces 1 and 2 in the diagram in FIG. 1a.

The moderately rich air/fuel ratio (approx. $\lambda$=0.97) of the internal combustion engine in traction mode changes to a very high value on transition to overrun mode, due to the lack of fuel supply. This is reflected in turn in a corresponding change in the exhaust gas composition from slightly reducing to strongly oxidizing, which is expressed by the profile of the exhaust gas/air ratio $\lambda$. The diagram in FIG. 1b shows the corresponding $\lambda$ values for the exhaust gas/air ratios up- and downstream of the catalyst (traces 3 and 4). The increase in the exhaust gas/air ratio $\lambda$ downstream of the primary catalyst (trace 4) is somewhat delayed relative to that upstream of the catalyst (trace 3), which has its basis in the exhaust gas travel time and the oxygen storage capability of the catalyst coating.

Figure 1A:
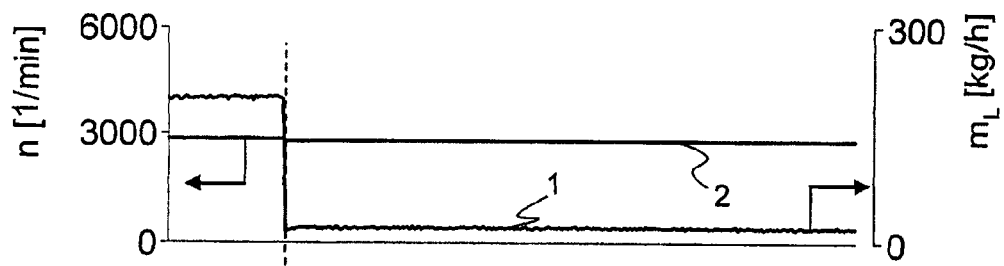
FIG. 1a is a time profile diagram of speed and intake air mass flow rate during a change in operating mode of an internal combustion engine from traction mode to overrun mode.
Figure 1B:
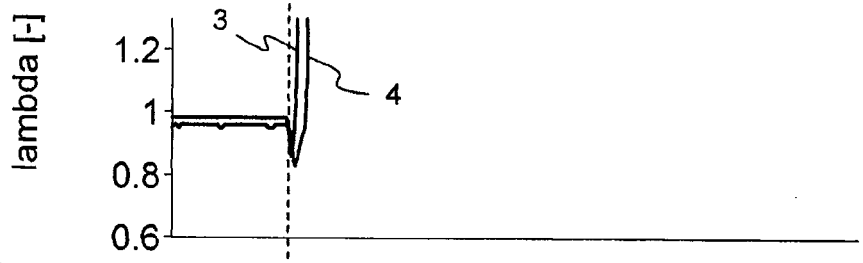
Figure 1C:
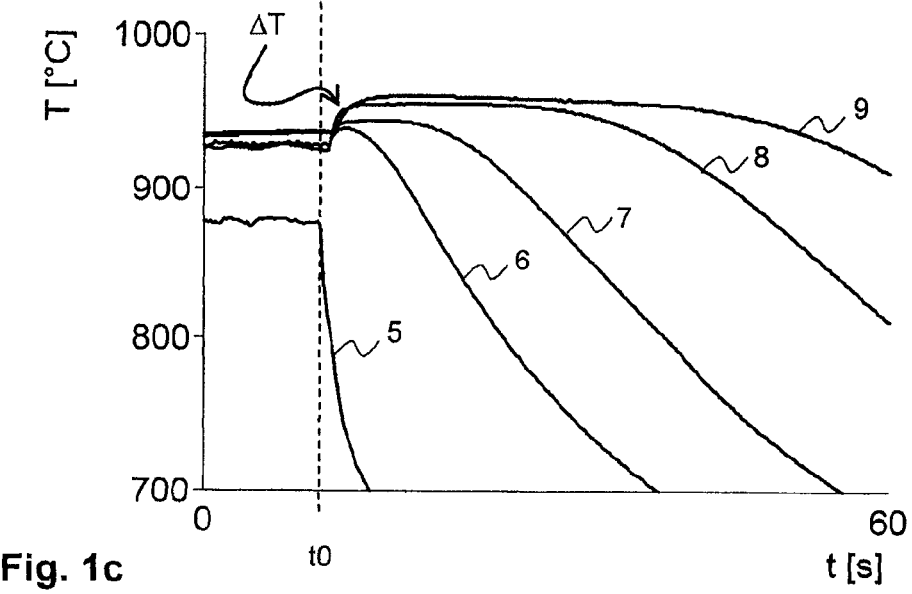

Of interest in this context are the profiles of the exhaust gas temperature and the temperatures in the exhaust gas catalyst illustrated the diagram in FIG. 1c. The profile of the exhaust gas temperature upstream of the catalyst is illustrated by trace 5, which traces 6, 7, 8 and 9 show temperature profiles detected in the catalyst at distances of approx. 5 mm, 20 mm, 40 mm and 60 mm from the exhaust gas inlet side by measurement with a respective thermocouple. As is apparent, the exhaust gas temperature upstream of the catalyst experiences an abrupt, very severe drop at the time t0 as a consequence of overrun fuel cut-off. In contrast, the temperatures of the catalyst coating initially rise. In particular, it is notable that this rise takes place virtually simultaneously at the measuring points arranged at different distances from the exhaust gas inlet. The reason for this is an exothermic modification transition of the cerium-containing components, acting as oxygen storage means, of the catalyst coating. The cerium present in reduced form under the reducing conditions of traction mode, for example as $Ce_2O_3$, is transformed, under the oxidizing conditions arising upon transition to overrun mode, into an oxygen-richer modification, for example into $CeO_2$. This oxygen uptake reaction proceeds very quickly and is exothermic, so that the temperature of the catalyst coating rises. The resultant temperature increase $\Delta T$ is detected by the thermocouples in thermal contact with the cerium-containing coating. As a consequence of the low exhaust gas temperature upstream of the catalyst, the temperature of the catalyst coating subsequently falls again. However, the temperature drop on the outlet side of the catalyst (trace 9) proceeds significantly more slowly than on the catalyst inlet side (trace 6). This shows the difference between a comparatively sluggish temperature change caused by convection and a temperature change acting immediately in the coating as a result of a modification transition of the oxygen storage material.

Due to the nature of the temperature change $\Delta T$, it is easy to detect whether (and to what extent) a modification transition occurs, (i.e., whether and to what extent oxygen storage capability is available). Since catalyst aging, for example as a result of exposure to elevated temperatures or poisoning, becomes apparent through a decline in oxygen storage capacity, an evaluation of the temperature change $\Delta T$ in the event of a change in operating mode makes it possible to assess the aging state of the catalyst and to perform catalyst diagnosis. To this end, for example, the magnitude of the temperature change $\Delta T$ or the ratio of the temperature values before and immediately after the change in operating mode is determined and compared with a reference value.

Figure 2A:
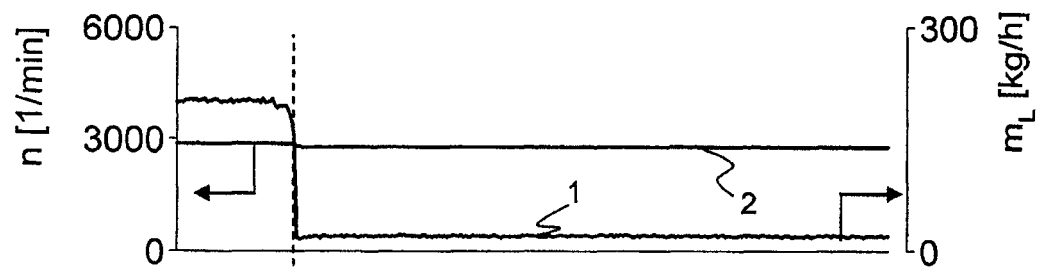
FIGS. 2a to 2c are diagrams corresponding to FIGS. 1a to 1c, for a catalyst without oxygen storage capability.
Figure 2B:
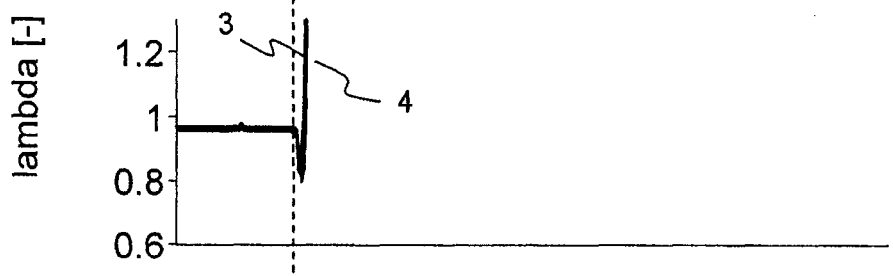
Figure 2C:
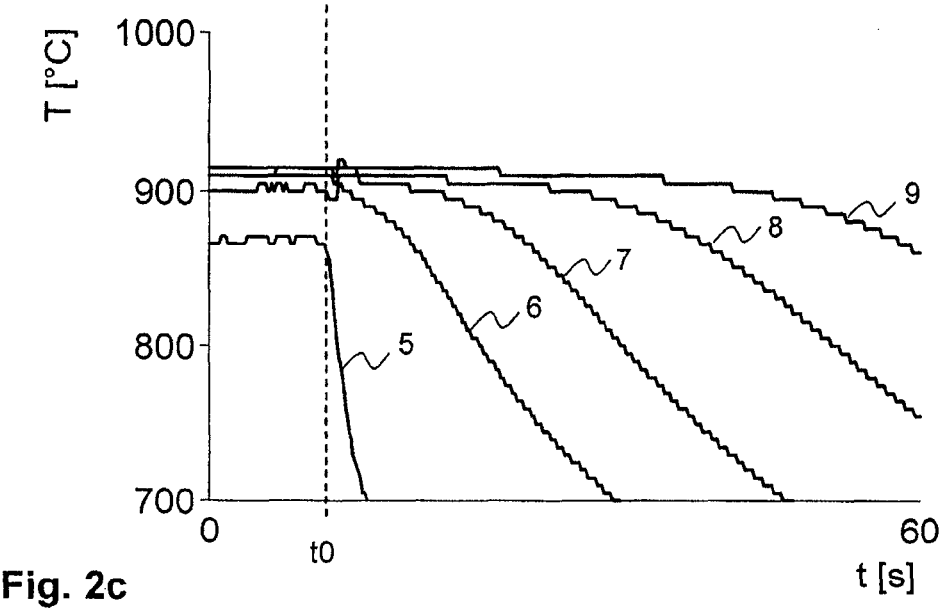

To clarify the situation, the conditions prevailing in the case of a catalyst without oxygen storage capability are illustrated in the diagrams in FIGS. 2a to 2c. The type of change in operating mode in this instance is similar to that illustrated in FIGS. 1a to 1c. Given this similarity, the traces in the diagrams are designated with the same reference numerals as in FIGS. 1a to 1c. However, no temperature change occurs in the catalyst coating in the event of the above-described transition from traction mode to overrun fuel cut-off. In this case it is insignificant whether the catalyst has no oxygen storage function from the outset or whether it has lost it completely over the course of time.

It is preferable, for an assessment of catalyst aging, to evaluate the temperature change occurring upon a change from reducing exhaust gas conditions to oxidizing exhaust gas conditions. A change in operating mode of the internal combustion engine, from traction to operation with overrun fuel cut-off is particularly suitable for this purpose. Since this type of change in operating mode often occurs during normal running of a motor vehicle, the above-described method of catalyst diagnosis may be used at comparatively short time intervals, making possible a particularly accurate diagnosis, for example by determination of a sliding average for an aging index derived from the temperature increase. In principle, the temperature change could also be evaluated in the event of heat absorption resulting from a transition from the oxygen-rich modification to the oxygen-depleted modification, because the process of oxygen storage is reversible, and in the event of a renewed change to reducing exhaust gas conditions the cerium-containing oxygen storage material changes back to its oxygen-depleted modification. It is difficult, however, to detect meteorologically the heat absorption occurring at this time.

It is clear from the above-explained situation that a change in internal combustion engine operation, from a less strongly oxidizing exhaust gas composition to a more strongly oxidizing exhaust gas composition (or vice versa) does not cause a temperature increase in the catalyst coating. The same applies to fluctuating conditions under which in each case reducing exhaust gas conditions are maintained, with an air ratio of $\lambda$<1.0. Conditions arise in each case which correspond to the conditions illustrated in the diagrams in FIGS. 2a to 2c. No further illustration is therefore necessary.

A particular advantage of the method according to the invention compared with other methods for determining gas or oxygen storage capability of exhaust gas purifying components resides in its lack of sensitivity to fluctuating boundary conditions, as is explained below with reference to FIGS. 3a to 6c. In these figures, each group of diagrams corresponds to that of FIGS. 1a to 1c, the respective conditions likewise corresponding substantially, for which reason only the most significant differences will be examined below.

Figure 3A:
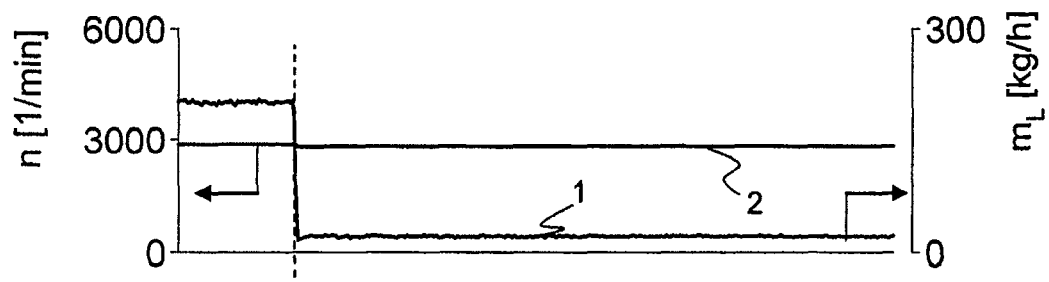
FIGS. 3a to 3c are diagrams corresponding to FIGS. 1a to 1c, for a change in operating mode starting from a comparatively lower lambda value in traction mode.
Figure 3B:
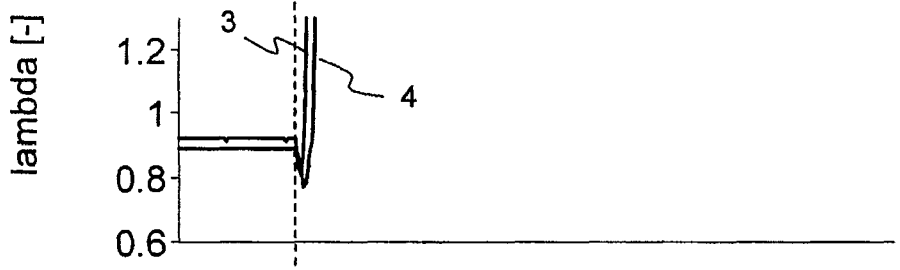
Figure 3C:
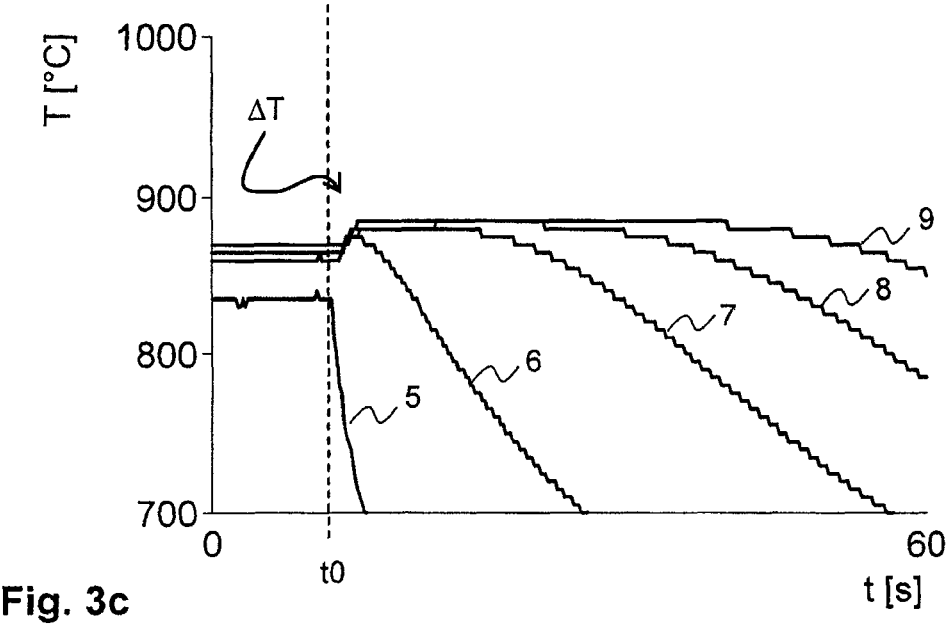

The diagrams in FIGS. 3a to 3c illustrate the insensitivity to the starting conditions for a change in operating mode from traction mode to overrun fuel cut-off. Unlike in the diagrams in FIGS. 1a to 1c, however, the sudden load variation of the internal combustion engine starts from an air/fuel ratio of the internal combustion engine of approx. $\lambda$=0.90 (thus, from a markedly richer value). A virtually equally marked temperature increase $\Delta T$ at the individual measurement points in the catalyst takes place as in the case of the sudden load variation starting from $\lambda$=0.97 illustrated in FIGS. 1a to 1c.

Figure 4A:
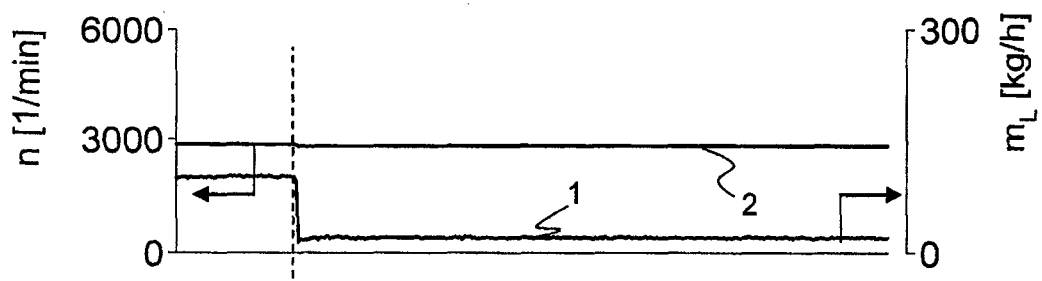
FIGS. 4a to 4c are diagrams corresponding to FIGS. 1a to 1c, for a change in operating mode with a comparatively reduced air mass flow rate.
Figure 4B:
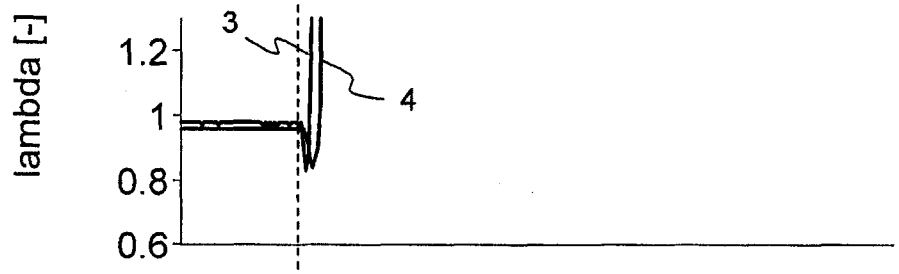
Figure 4C:
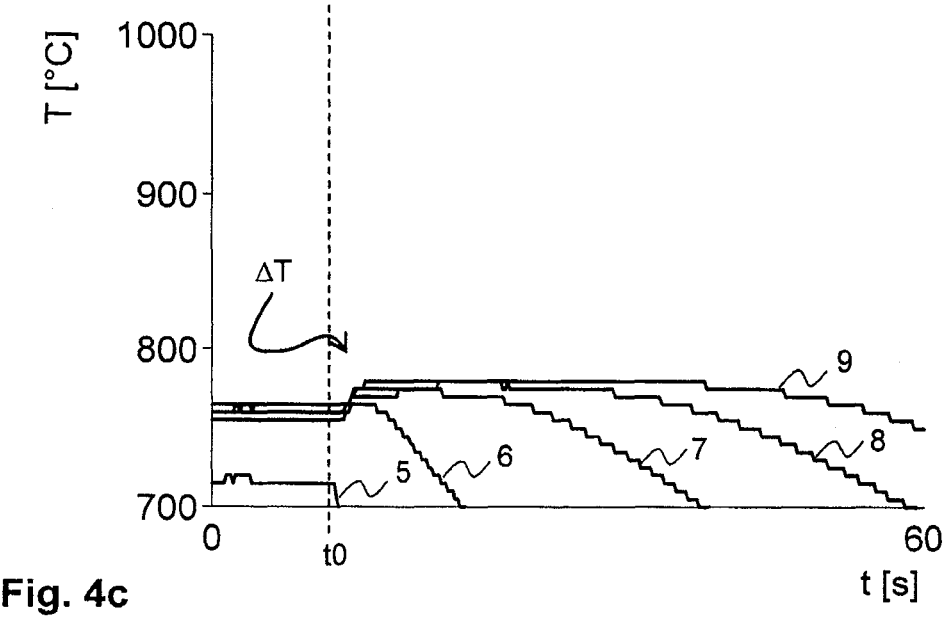

A change in the air mass flow rate (and thus in the exhaust gas mass flow rate) also barely influences the magnitude of the temperature increase $\Delta T$ in the catalyst material, as shown by a comparison of the diagrams in FIGS. 4a to 4c with those of FIGS. 1a to 1c. In this case, air mass flow rate mL is only half that under the conditions of FIGS. 1a to 1c, while the magnitude of the temperature increase ΔT, starting from a lower value, is virtually unchanged, as is clear from the diagram in FIG. 4c.

Figure 5A:
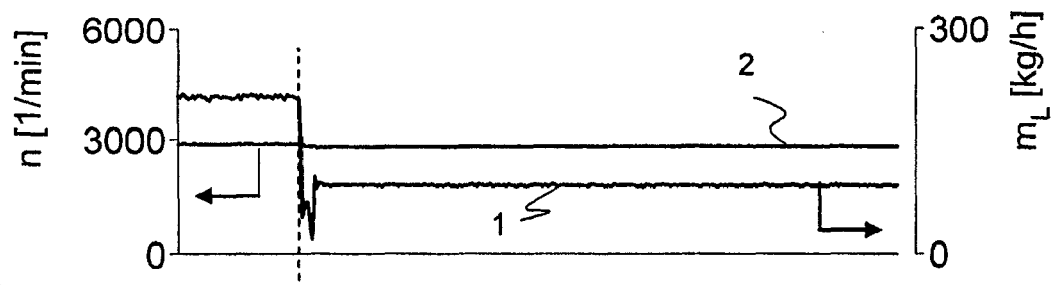
FIGS. 5a to 5c are diagrams corresponding to FIGS. 1a to 1c for a change in operating mode with a comparatively elevated overrun air mass flow rate in overrun mode.
Figure 5B:
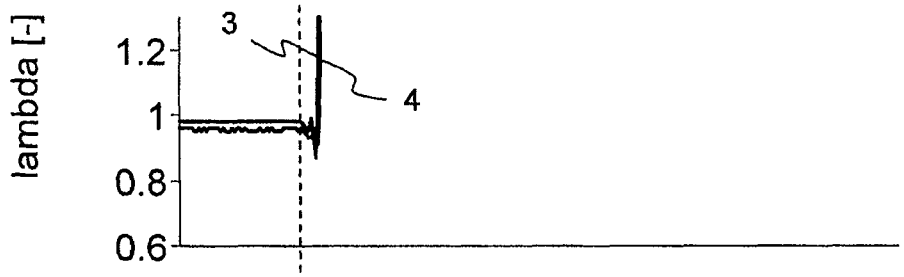
Figure 5C:
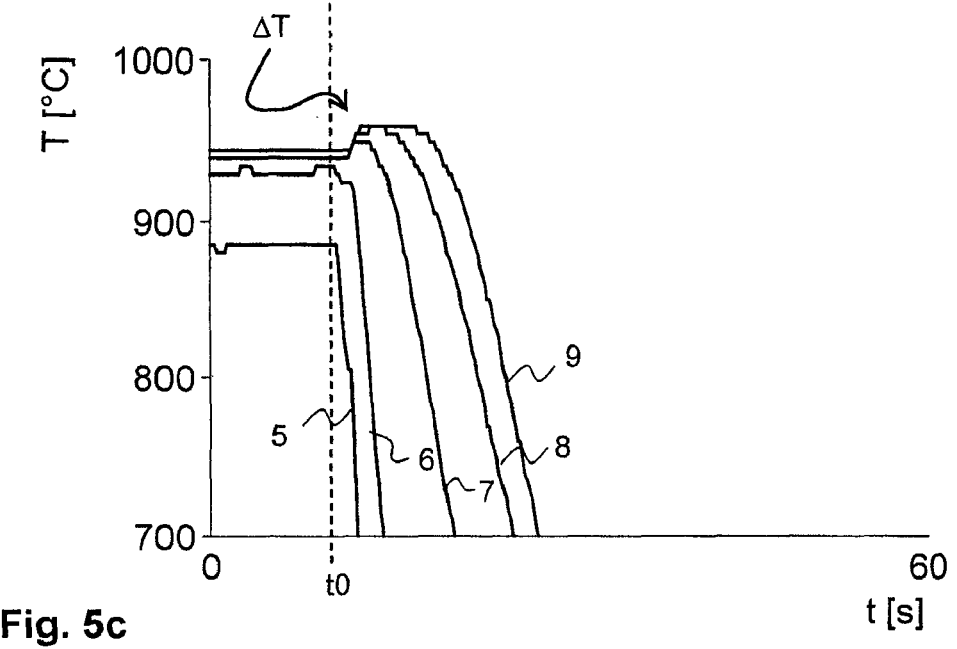

The magnitude of the overrun air mass flow rate established after the change to overrun mode has virtually no influence on the magnitude of the temperature increase, as can be seen from a comparison of the diagrams in FIGS. 5a to 5c with those of FIGS. 1a to 1c. In comparison to the conditions shown in FIGS. 1a to 1c, the overrun air mass flow rate has been quadrupled, which does result in faster cooling of the primary catalyst but has virtually no influence on the increase in temperature ΔT immediately after the sudden load variation at the time t0. Likewise of insignificant effect is a moderate input of reducing constituents into the exhaust gas once the change to the overrun phase has taken place.

Figure 6A:
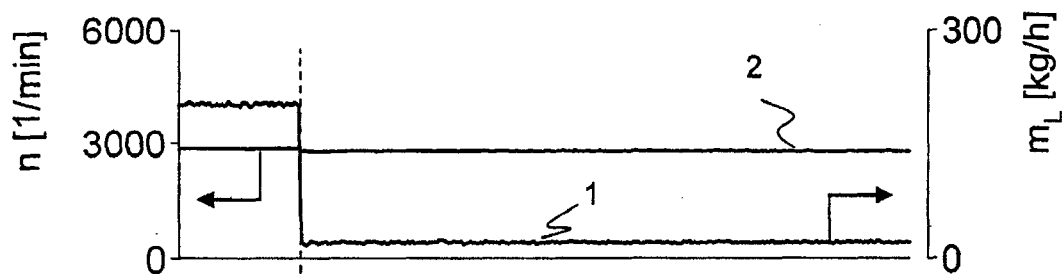
FIGS. 6a to 6c are diagrams corresponding to FIGS. 1a to 1c, for a change in operating mode with a comparatively elevated hydrocarbon content in the exhaust gas in overrun mode.
Figure 6B:
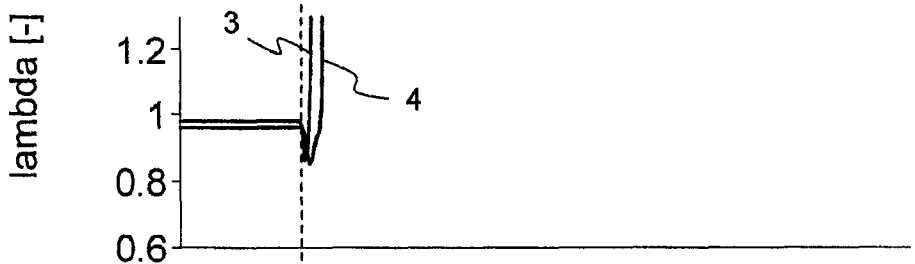
Figure 6C:
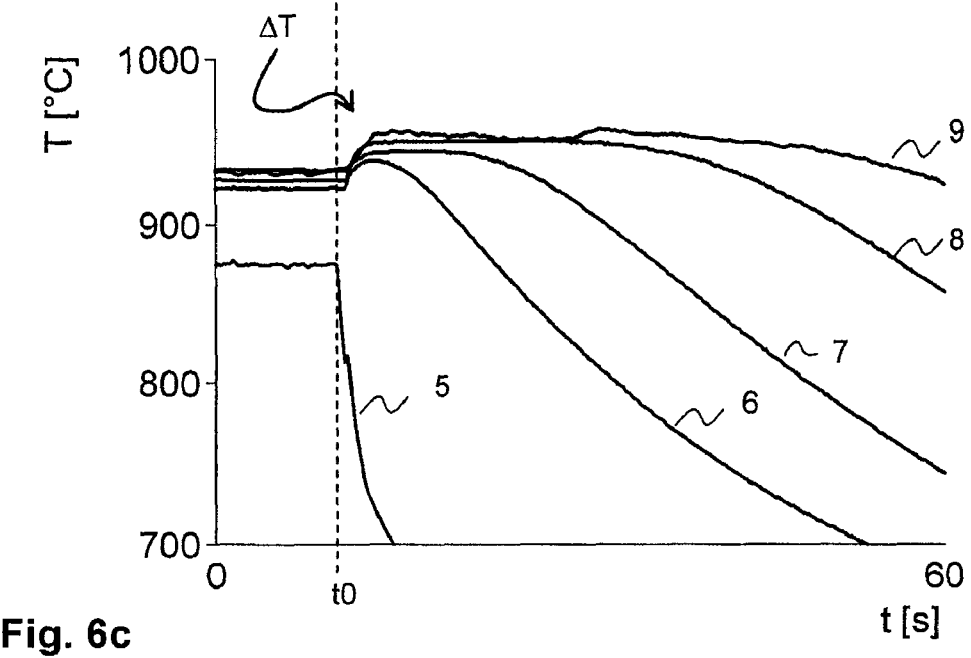

In the change in operating mode illustrated in the diagrams in FIGS. 6a to 6c, in contrast to the instance illustrated in the diagrams in FIGS. 1a to 1c part-load crankcase ventilation has taken place during overrun operation. Through part-load ventilation, hydrocarbons are also fed into the intake air in the overrun mode phase from time t0, which hydrocarbons are found again in the exhaust gas upstream of the primary catalyst due to a lack of combustion in the combustion chambers of the internal combustion engine. The hydrocarbons are oxidized in the primary catalyst, which results in a corresponding release of heat therein. Although this results in somewhat slower cooling of the primary catalyst compared with the instance without part-load ventilation, it does not affect the temperature increase ΔT in the primary catalyst occurring directly with the sudden load variation.

Figure 7A:
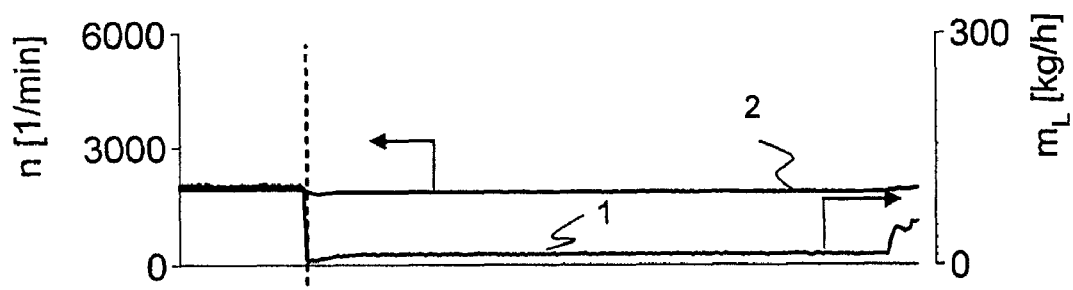
FIGS. 7a to 7c are diagrams corresponding to FIGS. 1a to 1c, for a catalyst without oxygen storage capability, but with an elevated fuel gas input in the event of a change in operating mode.
Figure 7B:
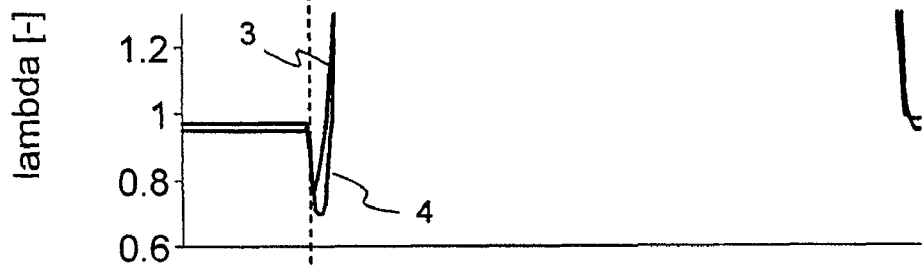
Figure 7C:
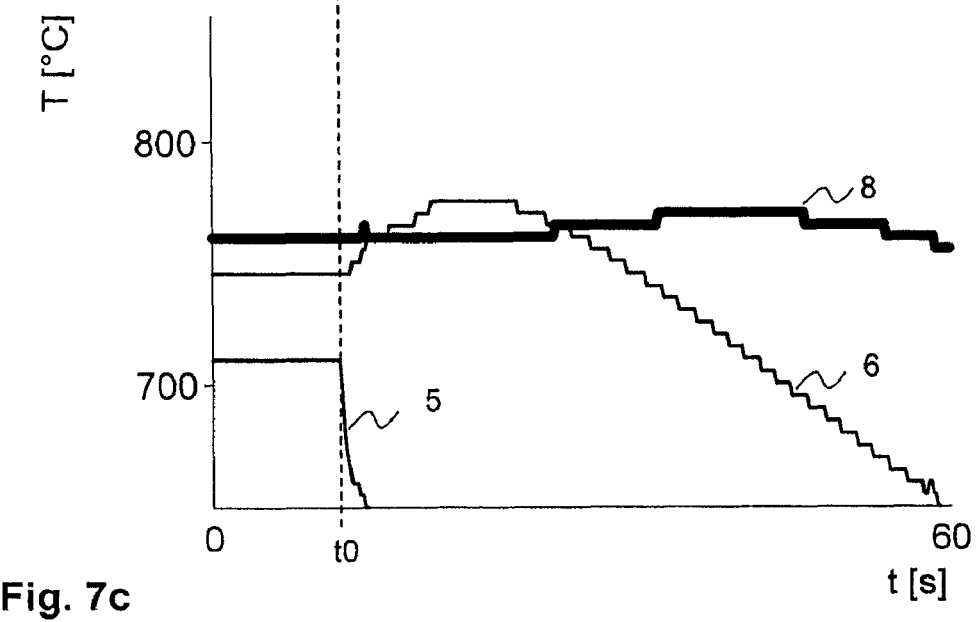

In comparison with the diagrams in FIGS. 1a to 1c, the profiles illustrated in the diagrams in FIGS. 7a to 7c again show on the one hand the difference between a temperature increase in the catalyst caused by gas oxidation and one caused by a modification change, and on the other hand the difference between a catalyst without an oxygen-storing coating and a catalyst with an oxygen-storing coating. In this case, a change in operating mode has taken place with a temporary fuel gas input which was very much higher than in the instance illustrated in FIGS. 1a to 1c. Such a change in operating mode with a temporarily very highly elevated fuel gas input, may occur for example due to intake-side detachment of a fuel or oil wall film upon transition from traction mode with weakly reducing exhaust gas conditions to overrun mode with strongly oxidizing exhaust gas conditions.

In this case, combustible constituents temporarily entering the exhaust gas are oxidized in the catalyst. This is expressed in a temperature increase spreading in the manner of a wave along the flow direction in the catalyst bed, which increase weakens with increasing distance from the catalyst inlet. As is clear from the diagram in FIG. 7c, the temperature increases are delayed and weakened in the area of the catalyst outlet (trace 8) relative to those in the area of the catalyst inlet (trace 6).

Such behavior may typically also be noted in the case of a catalyst with an oxygen-storing coating; however, in that case a modification transition additionally occurs in the oxygen storage material. The associated temperature increase ΔT then takes place, as shown in the diagram in FIG. 1c, roughly simultaneously and virtually without delay everywhere along the catalyst bed. As a consequence, it is possible to distinguish between the temperature-increasing effect of gas oxidation and that of a modification transition in the catalyst material, by measuring the temperature performed at a distance from the catalyst inlet. This means that, when temperature detection is performed at a distance from the catalyst inlet, particularly reliable catalyst monitoring may be performed with determination of the oxygen storage capability available therein. The temperature increase occurring directly upon a change in the operating mode of the internal combustion engine with a transition from reducing exhaust gas conditions with oxygen deficiency to oxidizing exhaust gas conditions with oxygen excess is then evaluated. In this way, temperature effects caused by gas oxidation may be effectively excluded.

It is clear from the above interrelationships that it is advantageous for detection of temperature changes to take place at a certain distance, with regard to the exhaust gas flow direction, from the exhaust gas inlet into the exhaust gas purifying component. With conventional catalysts, a distance of at least 10 mm from the exhaust gas inlet is advantageous. A distance of approx. 20 mm is preferred and a distance of more than 30 mm is particularly preferred.

The total component length is not decisive in this regard. In the experiments described, a catalyst with a length of approx. 75 mm was used. In this way, influences from exothermic gas reactions are limited. On the other hand, aging effects are generally particularly pronounced on the inlet side. For this reason, temperature detection is advantageous in a component area in which temperature increases resulting from gas oxidation are delayed relative to the temperature increases caused by a modification transition of the gas storage material. Since the stated negative influences are lacking when a catalytically active component is arranged upstream of the monitored exhaust gas purifying component, in such a case detection of the temperature increases may take place even directly at the exhaust gas inlet. This is the case for example with an underbody catalyst to be monitored, upstream of which there is arranged another catalytically active component.

It is clear from the above explanations that the method according to the invention is comparatively insensitive with regard to heat release caused by oxidation of exhaust gas constituents. Disturbance effects caused by gas oxidation may be largely ruled out in particular by arranging the temperature sensor at a distance from the inlet side of the corresponding catalyst. However, particularly reliable catalyst monitoring may be achieved if temperature changes in the catalyst material caused by modification transitions are evaluated merely with regard to changes in the operating mode of the internal combustion engine in which the exhaust gas composition is reducing prior to the change and substantially free of reducing constituents after the change. This makes possible particularly reliable detection of the temperature change associated with the modification transition in the catalyst material, since troublesome heat tonalities from gas oxidation reactions do not arise.

To detect the temperature increases in the exhaust gas purifying component or its coating, it is advantageous to use correspondingly temperature-stable thermocouples or resistance thermometers (preferably, provided with a jacket) as temperature sensors. In this way, the temperature-sensitive area is protected from direct contact with the exhaust gas. However, the temperature sensor is conveniently inserted into the exhaust gas purifying component in such a way that the temperature-sensitive part is in heat-conducting or heat-transfer connection with the exhaust gas purifying component or the coating thereof. Preferably, a temperature sensor with low thermal mass is used. The use of a mineral-insulated jacketed thermocouple with a jacket diameter of 10 mm is advantageous, for example. A jacket diameter of 5 mm or less is particularly preferred. For temperature measurement at axially or radially offset points in the exhaust gas purifying component, it is convenient to use a temperature sensor with a plurality of measurement points in a common protection tube. In this way, the aging state of the exhaust gas purifying component may be determined in a spatially resolved manner at a plurality of points offset axially or radially relative to one another.

The method according to the invention is applicable to all exhaust gas purifying components in which modification transitions with a heat tonality may occur in a solid assigned to the component, in particular as a result of a change in the exhaust gas composition. It is then possible to determine from the magnitude of the detected temperature increase the quantity of the solid capable of modification change or the age-related decrease therein, and from that the degree of catalyst aging. Preferably, for the purposes of assessment a comparison is made with stored reference values and an aging index is determined, for example.

The exhaust gas purifying component should originally comprise the material capable of modification change at least in places, temperature detection then taking place in this place. In particular, the method is suitable for monitoring components with an oxygen storage capability.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for monitoring an exhaust gas purifying component with gas storage capability for purifying exhaust gases from an internal combustion engine, the exhaust gas purifying component comprising a gas storage material which changes, at least in part, from a first modification into a second modification upon storage of gas, said method comprising:
   measuring a temperature change of the exhaust gas purifying component and/or of the gas storage material, substantially based on a heat of reaction of the modification transition; and
   evaluating said temperature change.

2. The method as claimed in claim 1, wherein the temperature change is evaluated with regard to aging of the exhaust gas purifying component.

3. The method as claimed in claim 1, wherein said evaluating step comprises evaluating a temperature change that occurs when an operating mode of the internal combustion engine changes.

4. The method as claimed in claim 3, wherein said evaluating step comprises evaluating a temperature increase that occurs upon a change from traction mode operation of the internal combustion engine with a hypostoichiometric air/fuel ratio to an overrun mode with a hyperstoichiometric air/fuel ratio.

5. The method as claimed in claim 1, wherein an exhaust gas purifying component with oxygen storage capability is monitored.

6. The method as claimed in claim 1, wherein an exhaust gas purifying component with a cerium oxide-containing gas storage material is monitored.

7. The method as claimed in claim 1, wherein temperature changes are measured at least two different points in the exhaust gas purifying component.

8. The method as claimed in claim 1, wherein detection of the temperature change takes place at a point spaced from an exhaust gas inlet side of the exhaust gas purifying component in the direction of exhaust gas flow.

9. The method as claimed in claim 1, wherein detection of the temperature increase takes place in an area of the exhaust gas purifying component which is spaced from the gas inlet side thereof in the direction of exhaust gas flow by more than 10 mm.

10. The method as claimed in claim 1, wherein detection of the temperature increase takes place in an area of the exhaust gas purifying component which is spaced from the gas inlet side thereof in the direction of exhaust gas flow by more than 20 mm.

11. The method as claimed in claim 1, wherein the temperature increase is measured by a temperature sensor which is inserted into the exhaust gas purifying component with a temperature-sensitive part of the temperature sensor in heat transfer contact with the gas storage material.

12. The method as claimed in claim 1, wherein the temperature increase is measured by a temperature sensor with a low thermal mass.

* * * * *